INVENTORS
JAMES FREDERICK TREU
JOSEPH EDRIC WHITENSTALL

3,436,449
GRANULATION OF THEROMPLASTIC MATERIALS
James Frederick Treu, Welwyn, and Joseph Edric Whitenstall, Harpenden, England, assignors to Imperial Chemical Industries Limited, London, England, a corporation of Great Britain
Filed Jan. 20, 1967, Ser. No. 610,643
Claims priority, application Great Britain, Feb. 3, 1966, 4,804/66
Int. Cl. B02c *18/12*
U.S. Cl. 264—142         13 Claims

ABSTRACT OF THE DISCLOSURE

Underliquid die-face cutting apparatus in which the cutter plate is insulated from the polymer source and molten polymer passes between them through a metal conduit in thermal contact with the latter but thermally insulated from the former. Preferably the metal bushing is lined with an insulation material, a material also possessing lubricating properties, e.g., polytetrafluoroethylene. The liquid is used to cool the freshly cut polymer and it is preferred that it be water or an aqueous solution. The cutter is suitable for granulating polypropylene.

---

This invention relates to the granulation of thermoplastic materials.

Many thermoplastic polymers are recovered from their process of manufacture in the form of powder or crumb. It is convenient for the polymer user to have polymer in the form of granules of uniform shape and size. One way of converting polymer powder to granules is by "die-face cutting," in which the polymer is melted in an extruder, extruded through a die orifice and cut into granules at the die-face by rotating knives. Preferably the molten polymer is extruded into a cooling liquid, since in this way it is cooled faster and more uniformly and more uniform granules can be obtained in consequence. This process is generally known as "underwater die-face cutting," since the cooling liquid is usually, although not necessarily, water. Therefore we shall refer to our process as "underliquid die-face cutting," where "liquid" refers to the liquid immersing the die-face.

Underwater die-face cutting has been employed on a large scale to granulate low density polythene. With higher melting polymers however, the process has not been so successful. Polypropylene, for example, has heretofore not been commercially granulated in this way because it freezes in the die-holes of the cutter face, blocking further extrusion. This freezing may be prevented by raising the temperature of the extrudate and cooling liquid, but it stops only at the point when the polymer has become too hot and sticky to cut properly, giving rise to smearing and congealed masses of polymer rather than clean cut uniform granules. Further, water alone can not be used as the coolant, if the coolant has to be maintained at temperatures over 100° C.

According to the present invention we provide an underliquid die-face cutting apparatus comprising a source of molten polymer, a cutter plate, heat insulating material between the source and the cutter plate, and a metal conduit passing through said insulating material from said source to said cutter plate, said conduit being in thermal contact with said source of molten polymer and thermally insulated from said cutter plate. We further provide a process for granulating thermoplastic materials, preferably polymers of 1-olefins having at least three carbon atoms, using the apparatus of our invention.

We prefer to line the metal conduit with a bushing of heat insulating material, e.g., nylon of ceramic, and particularly prefer to use a material such as polytetrafluorethylene which also possesses lubricating or non-stick properties. We particularly prefer to use glass-filled polytetrafluoroethylene, since bushings made of this material do not require to be replaced after each run.

A preferred embodiment of the invention will now be described with reference to FIGURES 1 and 2 of the accompanying drawings, in which.

Figure 1:
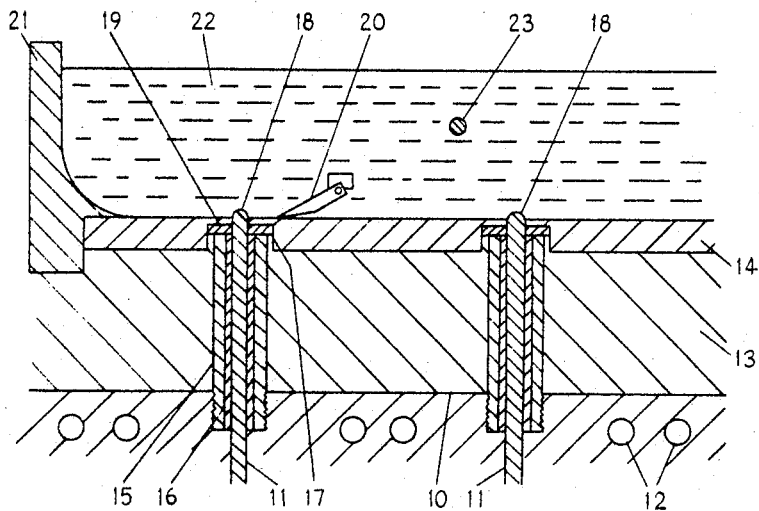
FIGURE 1 is a vertical section through part of the cutter plate assembly of a die-face cutter.
Figure 2:
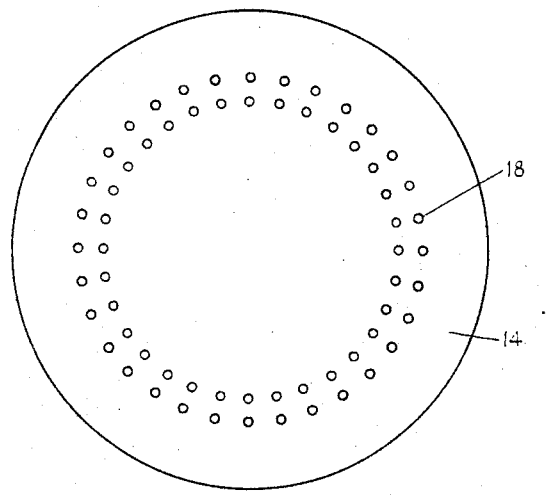
FIGURE 2 is a plan view of the cutter plate.

The die plate 10 is connected to a conventional screw extruder (not shown) by channels 11. The die-plate contains ducts 12 for circulating heating fluids, e.g., steam. Next to the die-plate is a layer 13 of asbestos board insulating material, about ½″ thick; on top of this the cutter plate 14 of hardened steel is held in position.

The channels 11 lead into mild steel conduits 15 of wall thickness about 0.03 inch, which are screwed into the die plate 10 forming a pressure-tight joint. Each steel conduit 15 is lined with a bushing 16 of wall thickness about 0.045 inch, made from polytetrafluoroethylene reinforced with 25% by weight of glass fibre. The other end of each conduit 15 is inset into a recess 17 in the cutter plate. This recess 17 has a slightly wider diameter than that of the conduit 15, so that the sides of the latter do not contact it. In the centre of each recess 17 is the die-hole 18 which is about ⅓₂″ in depth and about ³⁄₃₂″ in diameter. The end of the conduit 15 is insulated from the cutter plate by an asbestos washer 19, about ¹⁄₁₆″ thick. Above the cutter plate 14 are mounted four cutter knives 20 (one only being shown), pivotably mounted on a rotatable arm and biassed against the cutter plate surface by springs (not shown). These cutter knives 20 can be rotated at high speed in a path which carries them across the die holes 18. A bowl 21 surrounds the upper face of the cutter plate, being secured thereto by a waterproof joint.

In operation, thermoplastic material is fed into the extruder, where it melts. It is forced by the action of the extruder screw up into the channels 11. The die-plate is heated in known manner by fluid passing through the ducts 12, so as to provide a substantially uniform temperature in the die-plate and eliminate any tendency for the material to freeze therein. From the channel 11 it passes up through the steel conduit 15, through the insulating washer 19 and emerges from the die-hole 18 into cooling liquid 22. Here its surface is quenched and it is severed by a cutter knife 20, the speed of which is adjusted to the extrusion rate of the material so that an approximately spherical granule 23 results. This granule is carried away from the die-hole 18 by circulation of the cooling liquid, from which it is subsequently recovered and finally dried.

The above described apparatus has been used to granulate polypropylene using conventional extrusion conditions, e.g., 1800 p.s.i. at about 230° C. and excellent results were obtained. High outputs were obtained consistently over long periods without stoppages using water as the cooling liquid. We believe that our invention provides the first practicable method of die-face cutting polypropylene underwater. Other polymers which have been granulated using the described apparatus include high and low-density polyethylene and ethylene/vinyl acetate copolymers. The invention may also be applied to die-face cutting other polymers of olefines containing at least 3 carbon atoms, e.g., poly-4-methyl-pentene-1 and polybutene-1, as well as other polymers of high melting point (i.e., above 150° C.) and narrow melting temperature range which it has not previously been possible to granulate by underwater die-face cutting, such as nylon and polyethylene terephthalate.

We prefer to use water or aqueous solutions as the cooling liquid, preferably at a temperature of 30 to 50° C. When cutting polypropylene, the water temperature is preferably initially at the top end of this range; as the cutting output increases, the water temperature is suitably correspondingly lowered. Best results are obtained by using demineralised or distilled water, which may be recycled. Sodium nitrite may be added in small quantities as a corrosion inhibitor. Other liquids, e.g., glycol-water mixtures, may be used, however, for example where it is desired to raise the temperature of the cooling liquid above 100° C.

Using the described apparatus, we prefer that the cutter plate in the region of each die-hole shall be thin, i.e., not more than 0.04" in order to minimise freezing in the die-holes. Conveniently this is accomplished by countersinking in the region of the die-hole. For the same reason we prefer that the asbestos washer insulation between the cutter plate and the metal conduit shall be thin, i.e., less than $3/32$". The insulation between the cutter plate and the polymer source may consist at least partly of a stagnant air gap or gaps.

It should be appreciated that changing the operating conditions for the apparatus, or changing the material from which one or more of the components are formed, will produce corresponding changes in the preferred dimensions of the components. Thus, replacing the asbestos board of layer 13 by a material whose insulating properties are not as good as asbestos, would necessitate an increase in the thickness of the layer 13. It will be realized that the apparatus should be arranged to minimise freezing of the polymer. We have found that if the bowl 21 is of metal, improved results are obtained if the bowl is insulated from the cutter plate 14 to which the bowl is secured.

Figure 3:
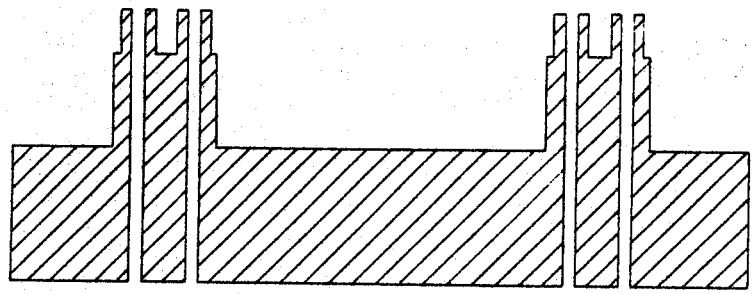

It is not necessary that the metal conduits should be thermally insulated from one another. FIGURE 3 of the drawings shows in vertical section a die-plate for use in a second embodiment of our invention, in which the metal conduits are formed integrally with each other in an annulus projecting from the die-plate. Only the ends of the conduits are separate, so that each can fit into its own recess in the cutter plate.

The cutter plate is conveniently flat, but it may also be curved.

It is sometimes found convenient to diminish the cross section of the polymer channels at a point between the die-plate and the cutter plate. This results in a steeper pressure gradient between this point and the die orifice and enables a lower initial extrusion pressure to be used.

We claim:

1. An underliquid die-face cutting apparatus comprising a source of molten polymer, a cutter plate, heat insulating material between the source and the cutter plate, the improvements comprising a metal conduit passing through said insulating material from said source to said cutter plate, said metal conduit being in thermal contact with said source of molten polymer but thermally insulated from said cutter plate.

2. Apparatus according to claim 1 wherein the inner surface of the metal conduit is provided with a lining of a heat insulating material.

3. Apparatus according to claim 1 wherein the said lining also possesses lubricating properties.

4. Apparatus acording to claim 1 in which the lining is polytetrafluoroethylene.

5. Apparatus according to claim 1 in which the polytetrafluoroethylene is glass filled polytetrafluoroethylene.

6. Apparatus according to claim 5 in which polytetrafluoroethylene contains 25% by weight of glass fibre.

7. Apparatus according to claim 1 wherein the cutter plate in the region of each die-hole is not more than 0.04 inch thick.

8. Apparatus according to claim 1 wherein the thickness of the insulating material between the cutter plate and the end of the conduit is not more than $3/32$".

9. A process for granulating a thermoplastic material comprising passing molten thermoplastic material in turn (1) through a die plate, (2) through a metal conduit in thermal contact with said die plate, (3) from said conduit to a cutter plate insulated from both the said conduit and the said die plate and (4) through an opening in said cutter plate into a cooling liquid and then severing the thermoplastic material passing through said opening in the cutter plate by means of a cutting knife.

10. The process of claim 9 wherein the thermoplastic material is an olefine polymer.

11. The process of claim 10 wherein the olefine polymer is a propylene polymer.

12. The process of claim 11 wherein the cooling liquid is water or an aqueous solution.

13. The process of claim 12 wherein the cooling liquid is maintained at a temperature of from 30 to 50° C.

References Cited

UNITED STATES PATENTS

| 2,850,764 | 9/1958 | Evans et al. | 264—143 |
| 2,862,243 | 12/1958 | Farr et al. | 264—142 |

LEONIDAS VLACHOS, *Primary Examiner.*

U.S. Cl. X.R.

18—1, 12; 264—141